United States Patent [19]

Rickett

[11] 4,349,437

[45] Sep. 14, 1982

[54] AUTOMATIC AND CONTINUOUS CHEMICAL FEED SYSTEM

[76] Inventor: David A. Rickett, 15600 Del Prado Dr., Hacienda Heights, Calif. 91745

[21] Appl. No.: 171,983

[22] Filed: Jul. 24, 1980

[51] Int. Cl.³ ............................................. B01D 33/38
[52] U.S. Cl. .................... 210/169; 210/172; 210/198.1
[58] Field of Search .......................... 141/95, 198, 382; 210/753–756, 765, 169, 172, 198.1, 927; 222/14, 526

[56] References Cited

U.S. PATENT DOCUMENTS

| | | |
|---|---|---|
| 618,349 | 1/1899 | Heany .......................... 210/198.1 X |
| 1,342,859 | 6/1920 | Moore ................................. 141/198 |
| 2,400,439 | 5/1946 | Pomans ............................... 210/765 |
| 2,495,937 | 1/1950 | Lawlor ................................ 210/265 |
| 2,541,799 | 2/1951 | White ................................. 210/765 |
| 2,552,491 | 5/1951 | Marks et al. ....................... 210/765 |
| 2,560,317 | 7/1951 | Wallace . | 
| 3,094,134 | 6/1963 | Currie .......................... 210/198.1 X |
| 3,129,172 | 4/1964 | Dickey, Jr. et al. . |
| 3,160,588 | 12/1964 | Alarie ............................. 210/169 X |
| 3,212,677 | 10/1965 | Hronas . |
| 3,304,564 | 2/1967 | Green et al. . |
| 3,415,378 | 12/1968 | Fukuda . |
| 3,595,395 | 7/1971 | Lorenzen ........................... 210/169 |
| 3,655,054 | 4/1972 | Pansini .............................. 210/169 |
| 3,672,508 | 6/1972 | Simon ............................. 210/169 X |
| 3,712,511 | 1/1973 | Magnasco ...................... 210/169 X |
| 3,760,947 | 9/1973 | Morrison ........................... 210/169 |
| 3,760,981 | 9/1973 | Weed ................................. 222/14 |
| 3,807,434 | 4/1974 | Rasmussen et al. ............ 210/169 X |
| 4,162,220 | 7/1979 | Serras ................................ 210/927 |
| 4,278,084 | 7/1981 | Pope, Jr. ........................... 210/927 |
| 4,303,515 | 12/1981 | Rademacher ....................... 210/169 |

FOREIGN PATENT DOCUMENTS 1245005  9/1960  France ............................. 210/198.1

OTHER PUBLICATIONS

Streeter, U. L., Fluid Mechanics, 1966, pp. 211–222.

Primary Examiner—Robert H. Spitzer
Attorney, Agent, or Firm—Lyon & Lyon

[57] ABSTRACT

An automatic and continuous chemical feed system for the introduction of a chemical solution into a liquid body. The system comprises a vessel for containing the cheical solution, a means for filtering the solution as it flows out of the vessel, a downcomer means having an inner diameter sufficiently large to spontaneously vent any gases which are formed in the solution back through the filter means and into the vessel, an adjustable standpipe means to regulate changes in the flow of the solution, a tubular connecting means to connect the downcomer means and the standpipe means and which initially determines the flow rate of the solution, and a tubular conveyance means attached to the standpipe to convey the chemical solution to a selected location in or above the liquid body. Once the vessel has been filled with the chemical solution, the flow of the solution is automatic and continuous. The flow rate can be varied by changing the height of the tubular connecting means in the standpipe means; the length and/or the diameter of the tubular connecting means; and/or the height of the liquid in the container. An anticlogging nozzle may be attached to the tubular conveyance means to permit the introduction of a scale-forming chemical solution below the surface level of the liquid body.

12 Claims, 3 Drawing Figures

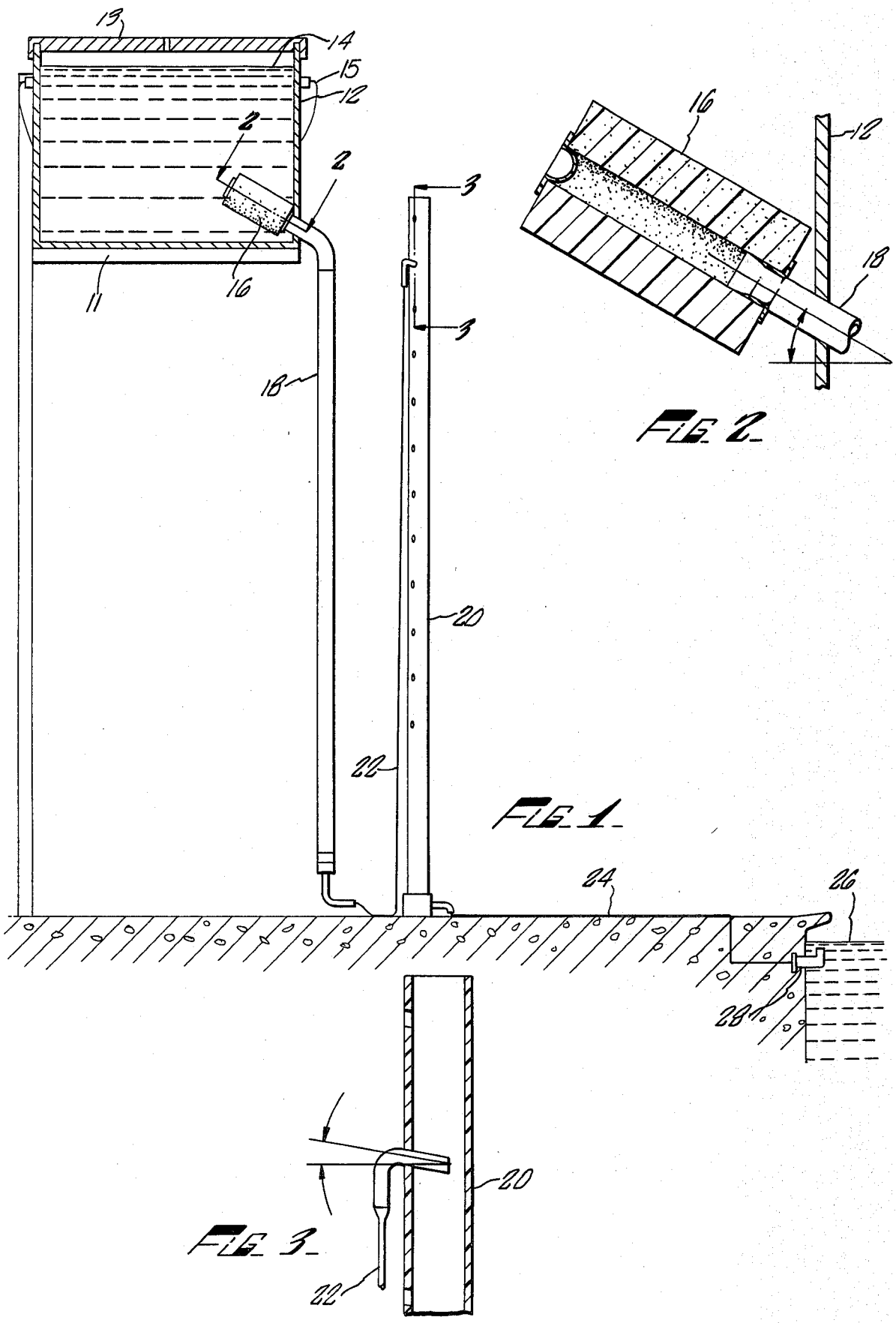

AUTOMATIC AND CONTINUOUS CHEMICAL FEED SYSTEM

CROSS-REFERENCE TO RELATED APPLICATION

This application is related to Application Ser. No. 819,966, filed on July 28, 1977, by David A. Rickett, previously abandoned.

BACKGROUND OF THE INVENTION

The present invention is directed to an automatic and continuous chemical feed system for the introduction of a chemical solution into a liquid body. More specifically, the chemical feed system of the present invention is particularly adapted for the introduction of chlorine, acid, and other water treatment chemical solutions into a swimming pool.

Large bodies of water, such as swimming pools, are generally continuously plagued with such problems as the continuous growth of algae and bacteria, and scaling. This growth and scaling is normally impeded by the addition of such chemicals as chlorine, various acids, bases or other liquid chemicals to control pH, biocides, or other water treatment chemicals, to the liquid body. Generally, these chemical solutions have been added to the liquid body by hand each time that the chemicals are required. However, such methods are inconvenient and often time-consuming. Alternatively, the chemical solution has been directly injected into the liquid body, but only by means of special and expensive chemical injection pump systems.

Moreover, while these chemical solutions typically successfully inhibit the growth of algae and bacteria, and reduce scaling, their addition to the liquid body normally results in a temporary increase in the concentration of that chemical in the liquid body. Thus, for example, the addition of large amounts of chlorine to a swimming pool causes the water to be temporarily unsuitable for swimming. Further, many of these chemical solutions, such as chlorine, are destroyed or are rendered inactive by sunlight. Consequently, it is necessary to add these chemical solutions to a swimming pool on a regular and routine basis, oftentimes inconveniencing the pool owner.

In contrast, the chemical feed system of the present invention enables a chemical solution to be introduced into a liquid body, such as a swimming pool, automatically and continuously without inconveniencing the owner or restricting the use of the pool.

SUMMARY OF THE INVENTION

The present invention provides a chemical feel system which automatically and continuously introduces a chemical solution into a liquid body such as a swimming pool. The chemical feed system of the present invention is particularly suitable for the introduction into a swimming pool of chemical solutions containing chemicals designed to treat the water, such as sodium hypochloride, muriatic acid, sulfuric acid, bromine chloride, a solution of iodine, bromine, di- or tri-chloro-triazinetrione, cyanuric acid, sodium bisulfate, sodium carbonate, and similar chemicals to control the pH of the liquid body and the growth of algae or bacteria.

The chemical feed system comprises a vessel for containing the chemical solution, a means for filtering the chemical solution as it flows out of the vessel, a downcomer means connected to the filter means and having an inner diameter sufficiently large to spontaneously vent any gases which are formed in the chemical solution back through the filter means, and into the vessel, an adjustable standpipe means to regulate changes in the flow of the chemical solution, a tubular connecting means to connect the downcomer means and the standpipe means and which initially determines the flow rate of the solution, and a tubular conveyance means attached to the standpipe means to convey the chemical solution to a selected location in the liquid body.

The filter means removes any plug-forming materials which may contaminate those chemicals which are commercially available for the treatment of swimming pools. The downcomer means ensures the availability of maximum head pressure to sustain the flow of the chemical solution for those solutions which may partially decompose into a gas. The standpipe means provides a simple method for quickly changing the flow rate of the chemical solution without changing the length and/or the diameter of the tubular connecting means. In addition, an anticlogging nozzle may be attached to the tubular conveyance means to permit the introduction of a scale-forming chemical solution below the surface level of the liquid body. Once the flow of the chemical solution in the system has been initiated by completely filling the vessel with the solution and fully "wetting" the filter means, the flow of the chemical solution is continuous and automatic. The rate of flow can be varied by changing the height of the tubular connecting means in the standpipe means, the length and/or the diameter of the tubular conveyance means, and/or the height of the liquid solution in the vessel.

Accordingly, it is an object of this invention to provide an automatic and continuous chemical feed system for the introduction of a chemical solution into a liquid body.

It is another object of this invention to provide an automatic and continuous feed system for adding chemical solutions to swimming pools which is inexpensive and requires a minimum of maintenance.

It is still another object of this invention to provide an automatic and continuous chemical feed system which filters the chemical solution to remove any plug-forming materials and which spontaneously vents any gases formed in the chemical solution back through the filter means and into the vessel containing the chemical solution.

It is a further object of this invention to provide an automatic and continuous chemical feed system which contains a standpipe means to easily and quickly regulate changes in the flow of the chemical solution.

The manner in which these and other objects and advantages of this invention are achieved will become apparent from the detailed description of the invention which follows and from the accompanying drawings which illustrate a preferred embodiment of the automatic and continuous chemical feed system of the present invention.

BRIEF DESCRIPTION OF THE DRAWINGS

FIG. 1 is a perspective view showing the principal elements of a preferred embodiment of the automatic and continuous chemical feed system of the present invention.

FIG. 2 is an expanded cross-sectional view along line 2—2 of FIG. 1 of the filter means of the chemical feed system.

FIG. 3 is an expanded cross-sectional view along line 3—3 of FIG. 1 of the standpipe means of the chemical feed system.

DETAILED DESCRIPTION OF A PREFERRED EMBODIMENT

Turning in detail to the drawings, FIG. 1 shows a chemical feed system comprising generally a vessel 12 for containing the chemical solution 14, a filter means 16 for filtering the chemical solution as it flows out of the vessel, a downcomer means 18 having an inner diameter sufficiently large such that any gases formed in the chemical solution are spontaneously vented back through the filter means and into the vessel, an adjustable standpipe means 20 which permits the flow rate of the chemical solution to be quickly and easily changed, a tubular connecting means 22 to connect the downcomer means and the standpipe means and which controls the flow rate of the solution, and a tubular conveyance means 24 to convey the chemical solution to a selected location in or above the liquid body 26. The tubular conveyance means may have an anticlogging nozzle 28 attached thereto.

The vessel 12 may be of any suitable material which is impervious to liquids and chemically resistant to water treatment chemicals, e.g., plastic. The vessel material must also be sufficiently rigid so that it is stable when positioned upon a fixed support above the ground and filled with the chemical solution. A particularly preferred material due to its cost and durability is a polyethylene plastic approximately 75 mils. thick, and a suitable vessel of this material can be purchased from Roper Plastics, Inc., at 15510 Blackburn Avenue, Norwalk, Calif. 90650, under the name "Saturn container and cover."

The vessel is also preferably provided with a cover 13 which acts as a sunshade to impede the sun from degrading the chemical solution, prevents any contaminants from entering the vessel, and reduces evaporation of the chemical solution. The cover may be internally recessed so that condensation will drain back into the vessel, and is provided with a vent to maintain atmospheric pressure as the solution flows out of the vessel and to permit any gases which form in the chemical solution to escape. The vessel may also be of any desired size; however, it has been found that a capacity of approximately 5 gallons provides the desired efficiency with minimum inconvenience. A handle 15 may also be attached to the vessel for ease of handling. The vessel is fixably positioned above the ground, preferably resting upon a support means 11, such as a secured platform. It has been found that a height above the ground of approximately 42 inches provides optimum convenience and flow control.

A small hole, preferably about 7/16 inches in diameter, penetrates either the bottom of the vessel or approximately one inch above the base of the vessel as shown in FIG. 1. Inside the vessel is a filter means which is adapted to remove from the flow of the chemical solution any plug-forming materials which often contaminate the chemicals which are commercially available for the treatment of swimming pools. Any suitable type of filtering means, including a filter cartridge, may be used. However, preferably the filtering means comprises a dual plug sealed $5'' \times 2\frac{1}{2}'' \times 1''$ polypropylene 25–50 micron medium density filter cartridge into which has been inserted a flexible plastic tube. Such a filter cartridge can be obtained from Ryan Herco Products Corp. at 2509 North Naomi in Burbank, Calif., under the name "polypropylene web cartridge." The filter cartridge is plugged at both ends with any suitable material. However, a round and smooth hole having a diameter slightly smaller than the outer diameter of the flexible plastic tubing is drilled through one of the plugs, and the flexible plastic tubing is tightly inserted through the hole and secured to the filter cartridge. Preferably, the flexible plastic tubing is a plasticized polyvinyl chloride tube about 4 inches in length with an inner diameter of about $\frac{3}{8}''$ and an outer diameter of about $\frac{1}{2}''$. Consequently, the hole which is drilled in the plug is preferably about 7/16". In addition, the filter means is positioned at an angle from the horizontal to aid in venting gases which are spontaneously formed in the solution due to its decomposition. Preferably, the filter means is positioned at an angle of about 30° from the horizontal.

The remaining end of the flexible plastic tube extends through the hole in the vessel, the diameter of the hole being just slightly smaller than the outer diameter of the flexible plastic tubing, and is attached to the downcomer means to form a strong and durable seal. If the hole penetrates the bottom of the vessel, the downcomer means may be inserted directly through the hole approximately $\frac{1}{4}''$ into the vessel to further enhance the strength and durability of the seal. The downcomer means is a tube preferably of a plastic material, such as polyethylene, which extends from the fixed support means 11 to the ground, e.g., about 42" in length when the vessel rests upon a secured platform which is elevated approximately 42" above the ground. It is imperative that the inner diameter of the downcomer means is sufficiently large to spontaneously vent back through the filter means any gases which are formed in the chemical solution. In this manner, the downcomer means assures the continuous availability of maximum head pressure to facilitate the flow of a chemical solution, such as sodium hypochloride, which may decompose partially into a gas. It has been found that an inner diameter less than $\frac{1}{4}''$ will not successfully continue to spontaneously vent any gases which are formed during the flow of the chemical solution. Preferably, the inner diameter is at least 5/16" with an inner diameter of $\frac{3}{8}''$ preferred to allow for tubing constriction during the assembly of the chemical feed system. In addition, the inner and outer diameters of the downcomer are preferably approximately the same as the 4" flexible plastic tubing so that a liquid-tight seal may easily be obtained when they are connected.

The standpipe means 20 is a rigid tubing, preferably of a plastic material such as polyvinyl chloride, e.g., Class 125 white polyvinyl chloride pipe which is obtainable from any irrigation supply store. The standpipe means is capped at its lower end and extends vertically upwards preferably about 48" in length and has an inner diameter of about $\frac{1}{4}''$. Changes in the rate of flow of the chemical solution are regulated by means of a series of holes which are drilled at various heights in the upper three-quarters of the standpipe tubing. The holes are preferably drilled on 3" centers and have a diameter of about 0.122". Moreover, the holes are drilled at an angle of about 10° from the horizontal to aid the flow of the chemical solution as shown in FIG. 3.

A tubular connecting means connects the downcomer means and the standpipe means and determines the initial flow rate of the solution. Any suitable flexible plastic tubing may be used; however, it is preferred that a polyethylene tube having an outer diameter of about 0.080" and an inner diameter of about 0.040" with a length of approximately 15 feet be utilized. The inner diameter of the tubular connecting means may, however, vary from 1/32" to 1/16", while the length may range from 5 feet to 500 feet. The very narrow inner diameter is necessary to restrain the flow of the chemical solution so that flow rates as low as a few ounces per day may be obtained, but the inner diameter must also be large enough to avoid plugging and to permit a flow rate of several gallons per week if desired. Changes in the flow rate from a few ounces per day to several gallons per week can be easily accomplished by changing the position of the tubular connecting means in the standpipe means rather than changing the length and/or the diameter of the tubular connecting means each time a change is desired. The tubular connecting means is inserted through a hole which has been drilled in a plug in the lower end of the downcomer means. Preferably the plug is a short cylindrical piece of $\frac{3}{8}" \times \frac{1}{2}"$ polyvinyl chloride which has a hole preferably about 0.113" in diameter drilled therein. A 4" flexible plastic tube with an outer diameter of $\frac{1}{8}"$ and an inner diameter of 1/16" may first be inserted through the hole in the plug, and the tubular means is then attached hereto. The remaining end of the tubular connecting means preferably terminates in a short, about 2" long, piece of flexible tubing, 1/16" by $\frac{1}{8}"$, which has an approximate V-shape and which is inserted through one of the holes in the standpipe means. Suitable tubular materials as described may also be obtained from Ryan Herco Products Corp.

The tubular conveyance means is attached at one end to the standpipe means, and the remaining end conveys the chemical solution to a selected location in the liquid body. A hole is drilled above the base of the standpipe means through the cap, and the conveyance tube is secured therethrough. The hole may preferably be about 9/32" in diameter and is drilled about $\frac{3}{4}"$ above the base of the standpipe. Two chemical feed systems as disclosed herein may be utilized at the same time by means of a Y-shaped tubular conveyance tube, each arm of the Y being connected to a different chemical feed system which may contain either the same or different chemical solutions.

The tubular conveyance means permits the chemical solution to be injected at a selected location, such as through the skimmer as shown in FIG. 1, or it may terminate above or below the surface of the water. An anti-clogging nozzle 28 may be utilized where a scale-forming chemical is to be injected below the water surface level in a pool. As shown in FIG. 1, such an anti-clogging nozzle may be a 90° elbow which is attached and sealed at one end to the tubular conveyance means while the other end of the elbow is oriented in an upward direction with the plane of the opening therein being horizontal to the surface of the liquid body. The open end of the anti-clogging nozzle is much larger than the inner diameter of the tubular conveyance means in order to maintain a smooth flow and to facilitate cleaning. Preferably, the opening varies from about $\frac{1}{4}"$ to about $1\frac{1}{2}"$ depending upon the time desired between cleaning.

It will be obvious to those skilled in the art that any suitable inert plastic materials may be utilized in the practice of the present invention. However, the particular plastic material described for each of the parts of the chemical feed system has been found to perform satisfactorily while minimizing the cost of materials. In addition, the plastic materials may be black pigmented in order to protect the material as well as the chemical solution from sunlight.

The chemical feed system of the present invention is preferably positioned adjacent to the liquid body, such as near the pump, filter and/or heater equipment of a swimming pool. The tubular conveyance means may be routed through existing open deck joints where available to avoid having the tubing exposed on the deck surface, or through ducts provided for such purpose. Operation of the chemical feed system must first be initiated by completely filling the vessel with water or similar cleansing liquid in order to begin flow through the dry filter and to flush the system of any contamination. Once the filter cartridge has been fully wetted, the flow will automatically continue when the vessel is less than completely full. The water or other liquid is then emptied from the vessel which is then refilled with the desired concentration of the chemical solution to be introduced into the liquid body. Examples of common chemicals typically used in treating swimming pools include sodium hypochloride, muriatic acid, sulfuric acid, bromine chloride, a solution of iodine, bromine and di- or tri-chloro-triazinetrione, cyanuric acid, sodium bisulfate, sodium carbonate and similar biocides, pH control or other water chemicals known to those who maintain swimming pools.

In general, the amount of the chemical solution required for the proper maintenance of a liquid body, such as a swimming pool, is dependent upon the size of the liquid body, the general weather conditions, the use of the liquid body, and the quality of the fill water. Moreover, changing the concentration of the chemical solution enables the actual amount of the pertinent chemical which is added to the liquid body to be varied. Thus, while the flow of the chemical solution out of the chemical feed apparatus of the present invention is continuous and automatic, the flow rate may be easily regulated to maintain a substantially uniform desired rate of flow to ensure that the proper amount of the chemical solution is being discharged into the liquid body. In particular, the rate of flow may be varied by changing the height of the tubular connecting means in the standpipe means, by changing the height of the chemical solution in the container, or by changing the length and/or the diameter of the tubular connecting means.

Consequently, the flow rate can be calculated as follows:

$$G = \frac{H \times S \times d^4}{6.31(10^{-4})Lu}$$

where:
u = absolute viscosity, cp
L = length of the tubular conveyance means, feet
S = specific gravity of the chemical solution
H = head (net difference in height between the height of the liquid solution in the vessel and the height of the tubular conveyance means in the standpipe means)
d = inside diameter of tubular conveyance means, inch G=flow rate, gpm (8 fluid oz/day=4.34×10$^{-5}$ gpm) Thus, the flow rate for a chemical feed system having a head of two feet, corresponding to a 2-foot difference between the height of the chemical solution in the container and the position of the tubular conveyance means in the standpipe means, a tubular conveyance means with an inner diameter of 1/32 of an inch and a length of 40.6 feet, and dispensing muriatic acid (31.5% HCl) having a specific gravity of 1.16 and a viscosity of 2 cp, is as follows:

$$G = \frac{2 \times 1.16 \times (1/32)^4}{6.31 \times (10^{-4}) \times 40.6 \times 2} = 4.32 \times 10^{-5} \text{ gpm} =$$

8 ounces/day = 1 cup/day

As can, therefore, be seen from the above calculations, the flow rate can be easily and readily adjusted by merely adjusting the height of the liquid solution in the container or the position of the tubular conveyance means in the standpipe means (H), or by varying the length of the tubular conveyance means (L). Furthermore, since the flow rate can be calculated in 8 ounce cups/day as shown:

$$G = \frac{H}{L} \times 20.21 \text{ (1/32 inch inside diameter)}$$

the flow rates for various lengths and heads are as follows:

|  | Flow Rate (in 8 oz. cups) | | | | |
|---|---|---|---|---|---|
|  | L (in ft) | | | | |
|  | 10 | 20 | 30 | 40 | 50 |
| 1 | 2.0 | 1.0 | 0.7 | 0.5 | 0.4 |
| 2 | 4.0 | 2.6 | 1.3 | 1.0 | 0.8 |
| H (in ft) 3 | 6.1 | 3.0 | 2.0 | 1.5 | 1.2 |
| 4 | 8.1 | 4.0 | 2.7 | 2.0 | 1.6 |
| 5 | 10.1 | 5.1 | 3.4 | 2.5 | 2.0 |

Preferably, the flow rate is maintained from about 3 to about 80 fluid ounces per day, depending upon the size of the liquid body and the chemical solution being introduced therein. Normally, the tubular conveyance means will continuously drip chlorine and high pH chemical solutions into the skimmer basket area. Additionally, the chemical solution may be discharged above the surface of the liquid body, such as at the lip of a swimming pool deck, or it may be discharged directly into the inlet area of the skimmer which is below the liquid surface level. However, high pH chemicals (strong bases) such as sodium hypochloride are discharged into the liquid body, the end of the tubular conveyance means must either remain above the surface level or terminate in an anti-clogging nozzle in order to impede the formation of scale at the discharge nozzle. When an anti-discharging nozzle as shown in FIG. 1 is utilized, the scale forms around the periphery of the elbow, thereby tending to leave the passageway through the elbow unplugged and facilitating easy cleaning. Acid and low pH chemical solutions may normally be discharged below the surface of the liquid body and away from the walls.

The chemical feed system as disclosed herein provides a simple and reliable apparatus for the automatic and continuous introduction of a chemical solution into a liquid body. In particular, the daily testing and addition of chemicals required in the maintenance of a home swimming pool is eliminated. For example, when the chemical feed system is filled with a chlorine solution to be added to a swimming pool or spa, the pool will stay sanitary and clear without any temporary interruptions in the use of the pool, and the chlorine solution in the vessel need be replenished only about every week, depending, of course, on the size of the pool. Consequently, the inconvenience and time-consumption is reduced, as well as the cost of maintenance. While the preferred embodiment and application of this invention has been shown and described, it would be apparent to those skilled in the art that many more modifications are possible without departing from the inventive concept herein described.

I claim:

1. An automatic and continuous chemical feed system for the introduction of a chemical solution into a liquid body comprising:
    a vessel vented to maintain atmospheric pressure for containing the chemical solution to be introduced into the liquid body, said vessel being fixably positioned above the ground and having an opening near the base thereof;
    a means for filtering said chemical solution as the solution flows out of the vessel;
    a downcomer means connected to said filter means and extending towards the ground, said downcomer means having an inner diameter sufficiently large to spontaneously vent any gases which are formed in the chemical solution back through said filter means and into said vessel;
    an adjustable standpipe means to regulate changes in the flow of the chemical solution;
    a tubular connecting means to connect said downcomer means and said standpipe means, thereby enabling the chemical solution to flow therebetween, said tubular connecting means determining the initial flow rate of the chemical solution;
    a tubular conveyance means attached to said standpipe means to convey the chemical solution to a selected location in or above the liquid body.

2. An automatic and continuous chemical feed system as in claim 1 wherein said filter means is positioned at an angle from the horizontal to aid in venting gases which are formed in the chemical solution back through the vessel.

3. An automatic and continuous chemical feed system as in claim 2 wherein said filter means is positioned at an angle of about 30° from the horizontal.

4. An automatic and continuous chemical feed system as in claim 1 wherein said downcomer means has an inner diameter greater than ¼".

5. An automatic and continuous chemical feed system as in claim 4 wherein said downcomer means has an inner diameter of about ⅜".

6. An automatic and continuous chemical feed system as in claim 1 wherein said adjustable standpipe means has a series of holes drilled at various heights therein to allow the position of the tubular connecting means to be adjusted, thereby regulating the flow of the chemical solution.

7. An automatic and continuous chemical feed system as in claim 6 wherein said holes are drilled at an angle of about 10° from the horizontal to aid the flow of the chemical solution.

8. An automatic and continuous chemical feed system as in claim 1 wherein said tubular conveyance means is provided with an anti-clogging nozzle to permit the introduction of a scale-forming chemical solution below the surface level of the liquid body.

9. An automatic and continuous chemical feed system as in claim 8 wherein said anti-clogging nozzle is a 90° elbow which is attached and sealed at one end to the tubular conveyance means such that the elbow is oriented in an upward direction with the opening therein horizontal to the surface of the liquid body.

10. An automatic and continuous chemical feed system for the introduction of a chemical solution into a swimming pool comprising:
   a vessel for containing the chemical solution to be introduced into the swimming pool, said vessel being fixably positioned above the ground and having an opening near the base thereof;
   a filter cartridge means for filtering said chemical solution as the solution flows out of the vessel, said filter cartridge means being positioned at an angle of about 30° from the horizontal to aid in venting gases formed in the chemical solution back through the vessel;
   a downcomer means which is connected to said filter cartridge means and which extends towards the ground, said downcomer means having an inner diameter sufficiently greater than ¼" such that gases formed in the chemical solution spontaneously vent back through said filter cartridge means and into said vessel;
   an adjustable standpipe means having a series of holes drilled vertically therein at an angle of about 10° from the horizontal to permit changes in the rate of flow of the chemical solution to be regulated;
   a tubular connecting means to connect said downcomer means and said standpipe means, the end of the tubular connecting means which is connected to the standpipe means being positioned in one of the holes drilled therein, said tubular connecting means determining the initial flow rate of the chemical solution;
   a tubular conveyance means attached to said standpipe means to convey the chemical solution to a selected location in the swimming pool.

11. An automatic and continuous chemical feed system as in claim 10 wherein said tubular conveyance means is provided with an anti-clogging nozzle to permit the introduction of a scale-forming chemical solution below the surface level of the swimming pool.

12. An automatic and continuous chemical feed system as in claim 11 wherein said anti-clogging nozzle is a 90° elbow which is attached and sealed at one end to the tubular conveyance means such that the elbow is oriented in an upward direction with the opening therein horizontal to the surface of the swimming pool.

* * * * *